3,271,245
N-TRICHLOROMETHYLTHIOHYDANTOINS FOR FUNGICIDAL COMPOSITIONS AND METHODS

Richard James Campbell-Davys Cremlyn, Binfield, and Richard Stewart Elias, Michael Joseph Augustine Geoghegan, and John Theodore Braunholtz, Bracknell, England, assignors to Imperial Chemical Industries Limited, London, England, a corporation of Great Britain
No Drawing. Original application Nov. 3, 1960, Ser. No. 66,911, now Patent No. 3,177,224, dated Apr. 6, 1965. Divided and this application Oct. 5, 1964, Ser. No. 401,640
Claims priority, application Great Britain, Nov. 10, 1959, 38,144/59
13 Claims. (Cl. 167—33)

This application is a divisional application of Serial No. 66,911, filed November 3, 1960, which is now U.S. Patent No. 3,177,224 of April 6, 1965.

This invention relates to hydantoin compounds having fungicidal properties, to a process for their preparation, and to fungicidal compositions containing them.

The invention provides compounds of the formula:

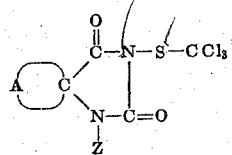

where the group A together with its adjacent carbon atom constitute a substituted or unsubstituted alicyclic ring having 5, 6 or 7 carbon atoms; and Z is an atom of hydrogen, an acyl group or a nitro group.

Compounds of this invention have been found to have useful fungicidal properties. In particular, some of them have shown marked activity against vine downy mildew (*Plasmopara viticola*).

The alicyclic ring can be a cycloalkyl ring, for instance a cyclopentane, cyclohexane or cycloheptane ring. The alicyclic ring can be one having one or more substituents, suitable substituents being alkyl radicals, for example alkyl radicals having 1–4 carbon atoms, or carbalkoxy radicals, for example carbalkoxy radicals having 1–5 carbon atoms. The alicyclic ring can be one having a fused ring, for example a cyclohexane or benzene ring. Where Z is an acyl group it can be, for example, one having 1–4 carbon atoms, for instance acetyl.

The present invention also includes a process for the preparation of hydantoin compounds in which an alkali metal salt of a 5:5-disubstituted hydantoin of the formula:

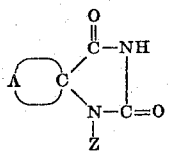

where A and Z have the meanings given to them above is treated with perchloromethylmercaptan (also known as trichloromethylsulphenyl chloride). The alkali metal of the salt is conveniently sodium, and the reaction can be performed using the alkali metal salt in the form of an aqueous solution. Where such an aqueous solution is used it has been found convenient in general to carry out the reaction at about room temperature, that is at a temperature in the range 10–30° C.

Where the alkali metal salt of the hydantoin is the sodium salt, it can in general be obtained in situ by dissolving the hydantoin in an aqueous solution of sodium hydroxide. However, where the hydantoin used in the above process is only sparingly soluble in water, it is sometimes advantageous to use the sodium hydroxide in solution in aqueous ethanol or aqueous dioxan instead of plain water.

In some instances it has been found that there is a tendency for the N-trichloromethylthiohydantoin product to be contaminated with the parent hydantoin. This can be overcome by covering the reaction mixture with a layer of toluene, preferably equal in volume to the aqueous reaction mixture. The product readily dissolves in this toluene layer which can be subsequently separated and evaporated to yield crude N-trichloromethylthiohydantoin.

In the preparation of the compounds of the invention where Z is a hydrogen atom, the 5:5-disubstituted hydantoin employed as starting material in the foregoing process can be obtained from the corresponding ketone by treatment with sodium cyanide and ammonium carbonate using the general procedure of Bucherer and Lieb (J. prakt. Chem., 1934, 141, 5). 5:5-disubstituted hydantoins can also be prepared by another method in which the ketone is first treated with potassium cyanide and ammonium chloride in cold aqueous solution, the product obtained is separated and then heated with sodium cyanate in aqueous acetic acid to which concentrated hydrochloric acid is added in the final stage of the reaction. Where the ketone is such that the 5:5-disubstituted hydantoin obtained can exist in different geometric isomers, the method of Bucherer and Lieb appears to lead largely to the production of one geometric isomer (referred to below as the α-isomer), whereas the cyanate synthesis leads solely to a different product (referred to below as the β-isomer). The present invention includes both α and β-isomers.

The present invention further includes fungicidal compositions comprising, as active ingredient, a compound of this invention and a carrier (which can be a liquid or a solid) for the compound. The invention, therefore, includes liquid compositions obtained by dissolving or dispersing the active ingredient in a suitable liquid, for example water or a suitably non-phytotoxic organic solvent.

The fungicidal compositions can be ones in which the active ingredient is in admixture with a powder diluent which can be, for example, powdered talc, china clay, gypsum, basic slag, kieselguhr or bentonite. The proportion of the active ingredient used in such compositions depends largely upon the activity of the compound towards the fungus disease to be controlled. For example, the proportion of the active ingredient can be from 2% to 50% or more of the total weight of the composition and especially from 5% to 25% by weight.

The fungicidal compositions can contain, if desired, a suitable wetting or dispersing agent, or other suitable auxiliary agents known in the art as being useful in fungicidal formulations. A suitable wetting agent is a condensation product of ethylene oxide with an alkyl phenol, for example, the product obtained by condensing octylcresol with 7–8 molecular proportions of ethylene oxide.

The invention includes a method of combating plant pathogens, in which the foliage of a plant susceptible to such pathogens, or seed from which the plant can be grown or mould in which the plant is to be grown is treated with a hydantoin compound or with a fungicidal composition of this invention.

Several of the compounds of this invention have been found to be very effective as fungicides in paint and certain cellulose products, for example cotton cloth and timber.

Thus the invention further consists in a method of protecting a cellulosic vendible product from attach by fungi, in which the product is treated with a hydantoin compound or with a fungicidal composition of this invention.

The invention is illustrated by the following examples in which, unless otherwise stated, the parts referred to are parts by weight.

EXAMPLE 1

This example describes the preparation of α-4′-methylcyclohexane - N - trichloromethylmercapto-5:5-spirohydantoin.

α-4′-methylcyclohexane-5:5-spirohydantoin (3.6 parts) was dissolved in 60 parts of water containing 0.8 part of sodium hydroxide. The resulting solution was cooled to 0° C. and an ethereal solution of perchloromethylmercaptan (3.7 parts) was added as drops to the solution with stirring. Stirring was continued for 2 hours at room temperature and the mixture allowed to stand overnight. The solid product obtained was filtered off and twice recrystallised from ethanol to give α-4′-methylcyclohexane - N - trichloromethylmercapto - 5:5 - spirohydantoin as white feathery clusters, M.P. 246–8° C.

EXAMPLE 2

This examples describes the preparation of α-3′:4′-dimethylcyclohexane - N - trichloromethylmercapto - 5:5-spirohydantoin.

α-3′:4′-dimethylcyclohexane - 5:5 - spirohydantoin (2 parts) was dissolved in 40 parts of water containing 0.5 part of sodium hydroxide. The resulting solution was cooled to 0° C. and, while being mechanically stirred, a solution of perchloromethylmercaptan (2 parts) in ether (15 parts) was added as drops. The stirring was continued for 2 hours at room temperature after the addition of all of the perchloromethylmercaptan and then the reaction mixture was heated at 35° C. for 1½ hours. After cooling the reaction mixture, the solid white product which had formed was purified by recrystallisation from methanol to give α-3′:4′-dimethylcyclohexane-N-trichloromethylmercapto; 5:5-spirohydantoin, M.P. 190–4° C.

A variety of other N-trichloromethylmercapto-5:5-spirohydantoins were prepared by processes analogous to that of Example 1 using the appropriate substituted 5:5-spirohydantoin in place of the hydantoin used in that example. The products obtained are shown in the Table 1 below in which they are designated Examples 3–23. Since a number of the products listed in Table I can possess optical activity and can exist in stereoisomeric forms, their melting points are dependent to some extent upon the exact method of preparation and upon the form in which the product is obtained.

The products of Examples 3–23 are believed to all have the formula:

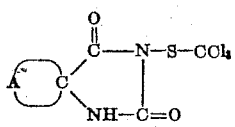

where A has the meaning given to it above. The identity of the compounds of Examples 3–23 is shown in the column headed "Compound," in which is set out the nature of the group of the product of each of the examples.

Table 1

| Example No. | Compound | Isomer | Melting point, ° C. |
|---|---|---|---|
| 3 | (cyclohexane-spiro) | ---------- | 162–4 |
| 4 | (cyclohexane-spiro) | ---------- | 184–6 |
| 5 | (cycloheptane-spiro) | ---------- | 209–211 |
| 6 | (cycloheptane-spiro) | α | 157–9 |
| 7 | (decalin-spiro) | α¹ | 226–230 |
| 8 | COOC₂H₅ substituted cyclohexane | α | 158–160 |
| 9 | COOC₂H₅ substituted cyclohexane | α | Syrup |
| 10 | CH₃ substituted cyclohexane | α | 204–6 |
| 11 | CH₃ substituted cyclohexane | β | 191–4 |
| 12 | CH₃ substituted cyclohexane | α | 233–9 |
| 13 | CH₃ substituted cyclohexane | β | 230–2 |
| 14 | CH₃, CH₃ / CH₃ substituted cyclohexane | α | 209–210 |
| 15 | CH₃, CH₃ / CH₃ substituted cyclohexane | β | 202–3 |
| 16 | CH₃ / CH(CH₃)₂ substituted cyclohexane | α | 128–134 |
| 17 | CH₃ substituted cyclohexane | α | 193–4 |
| 18 | tert.C₄H₉– substituted cyclohexane | α | 254–5 |
| 19 | nC₃H₇ substituted cyclohexane | α | 170–1 |
| 20 | C₄H₉-n substituted cyclohexane | α | 150 |

Table 1.—Continued

| Example No. | Compound | Isomer | Melting point, °C |
|---|---|---|---|
| 21 | 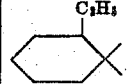 (C₂H₅, CH₃) | α | 169-170 |
| 22 | 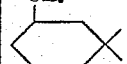 (CH₃, CH₃) | α | >320 |
| | 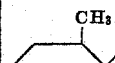 (CH₃, CH₃) | α | Gum |

[1] Cis and trans mixture.

A number of the hydantoin compounds obtained as products of Examples 1-23 above have been found to be effective against vine downy mildew (*Plasmopara viticola*) when applied as an aqueous solution or dispersion to young vine leaves by means of a dip test. All of the compounds tested have been applied as a protectant and several of them also as eradicant fungicides.

The protectant test was carried out as follows:

Young vine leaves were immersed at room temperature for 5 minutes in a 0.1% aqueous solution of an alkylphenoxy polyoxyethylene ethanol sold under the trade name Igepal CO-630. The leaves were then removed and immersed in an aqueous solution or suspension of the hydantoin compound at 20° C. for 5 hours, removed and allowed to dry overnight. The treated leaves were inoculated on the under-surface with a suspension of zoospores of *P. viticola*, incubated at 100% R.H. for 24 hours and then moved to a glasshouse where they were kept for seven days. At the end of this period the leaves were incubated for a second period of 24 hours at 100% R.H. to stimulate the production of sporangiophores—the visible symptom of infection. The amount of infection of the undersurface of the leaves was then assessed visually in comparison with the infection of inoculated but untreated control leaves.

An eradicant test was carried out with several compounds by the test described above, but inoculating the leaves before treatment with Igepal CO-630 and with hydantoin. The results obtained from the tests are set out in Table 2 in which the amount of infection observed on the leaves is represented by the following grading symbols.

| Grading symbol | Amount of infection |
|---|---|
| 0 | None. |
| T | Trace. |
| 1 | Slight. |
| 2 | Moderate. |
| 3 | Equivalent to observed infection of control leaves. |

Table 2

Vine downy mildew (*Plasmopara viticola*)

| Product of Example No. | Concentration (p.p.m.) | Eradicant Test | | | Protectant Test | | |
|---|---|---|---|---|---|---|---|
| 1 | 100 | T | 0 | 1 | T | 1 | T |
|   | 10 | 1 | 0 | Dead | 1 | 2 | T |
| 10 | 100 | 3 | 3 | 3 | 1 | 1 | T |
|   | 20 | 2 | 3 | 3 | 2 | 3 | 3 |
| 12 | 100 | | | | 1 | 1 | 1-2 |
|   | 50 | | | | 1 | T | 0 |
|   | 25 | | | | 1 | 1-2 | 0 |
| 2 | 64 | | | | T | 0 | 0 |
|   | 16 | | | | 1-2 | 1 | 0 |
|   | 4 | | | | 2 | 1-2 | 1-2 |
|   | 1 | | | | 1-2 | 1 | 0 |
| 6 | 100 | 2 | 0 | Dead | 0 | 0 | 0 |
|   | 10 | 1 | T | 1 | 0 | 1 | 1 |
| 16 | 100 | | | | 0 | 1 | 0 |
|   | 10 | | | | 0 | T | T |
|   | 5 | 2 | 3 | 3 | 0 | 0 | 0 |
|   | 2.5 | 1-2 | 1-2 | 2 | 0 | 3 | Dead |
| 3 | 100 | | | | 0 | 0 | 0 |
|   | 10 | | | | 1 | T | 3 |
| 5 | 10 | 0 | 0 | Dead | T | 0 | T |
|   | 2.5 | 1 | 1 | T | 2 | 2 | 1 |
| 17 | 25 | | | | 0 | 0 | 0 |
|   | 5 | | | | 1 | T | 1 |
| 9 | 100 | 2 | 2 | 1-2 | 0 | 0 | 0 |
|   | 20 | 2 | 1-2 | 1 | 3 | 3 | 0 |
| 26 | 16 | | | | 2 | 1-2 | 0 |
|   | 9 | | | | 0 | 0 | 0 |
|   | 4 | | | | 2 | 2 | 1-2 |
|   | 3 | | | | 1 | 0 | 2 |
|   | 1 | | | | 2 | 3 | 0 |
| 25 | 16 | | | | 0 | 0 | 0 |
|   | 9 | | | | 0 | 0 | 0 |
|   | 4 | | | | 1-2 | 0 | 0 |
|   | 3 | | | | 1 | 0 | 0 |
|   | 1 | | | | 2 | 3 | 2 |
| 24 | 16 | | | | T | 0 | 1 |
|   | 9 | | | | 1 | 1 | 0 |
|   | 4 | | | | 2 | 1 | 0 |
|   | 3 | | | | 2 | 1 | 1-2 |
|   | 1 | | | | 2 | 1 | 1-2 |
| 23 | 16 | | | | T | 0 | 0 |
|   | 9 | | | | 1-2 | 2 | 0 |
|   | 4 | | | | 0 | T | 0 |
|   | 3 | | | | 1 | T | 1 |
|   | 1 | | | | 1 | 1 | T |
| 22 | 16 | | | | 0 | 0 | 0 |
|   | 4 | | | | 0 | 0 | 0 |
|   | 1 | | | | T | 0 | 0 |

Several compounds of the invention have been found to be effective against rice blast disease (*Piricularia oryzae*).

Each of the compounds tested was first formulated as a liquid fungicidal composition consisting of a 0.05% solution or dispersion in water containing as wetting agent 0.15% of a polyoxyethylene sorbitan monolaurate sold under the trade name "Tween 20."

The fungicidal compositions were tested as follows:

Rice plants each having 4-5 open leaves were sprayed with the liquid composition for 30 secs. on a turn-table using an Aerograph type C.H. touch-up gun operating at 40 lb./sq. in. air pressure, the spray being applied to two replicate pots, each containing 20 rice plants.

The sprayed plants were allowed to dry overnight and were then inoculated with an aqueous spore suspension of *Piricularia* oryzae containing about 150 thousand spores/ml. The spore suspension was applied with an Aerograph type M.P. gun operating at 10 lb./sq. in. air pressure to batches of plants standing in an open-topped, muslin-covered box, using 3 ml. per pot of 20 plants. The plants were then incubated at 100% R.H. for 24-36 hours and then returned to the greenhouse.

Four or five days after inoculation the number of lesions on the leaves were counted. The mean number of lesions observed on the treated leaves are expressed in Table 3 below as percentage of those observed on unsprayed but inoculated control plants.

Table 3

Rice blast (Piricularia oryzae)

| Product of Example No.: | Disease rating (percent) |
|---|---|
| 1 | 42 |
| 10 | 17 |
| 12 | 35 |
| 14 | 7 |
| 6 | 35 |
| 4 | 41 |
| 7 | 40 |
| 17 | 12 |
| 8 | 25 |

Compounds of the invention have been found to be active against a variety of other fungus diseases. Examples of these diseases are given below together with compounds active against them. The compounds tested had all been previously obtained as described in Examples 1–23 above, and they are referred to below as the product of the relevant example.

Wheat rust (*Puccinia triticina*): The products of Examples 3, 5 and 12.

Pea foot-rot (*Pythium ultimum*): The products of Examples 1, 2, 3, 4, 5, 6, 7, 8, 20, 21, 22 and 23.

Cereal foot-rot (*Fusarium culmorum*): The products of Examples 1, 2, 3, 4, 5, 6, 8, 9, 10, 12, 16, 20, 21 and 22.

Cotton sore shin (*Rhizoctonia solani*): The products of Example 3, 6, 12, 14, 17 and 19.

Other plant pathogens against which a number of compounds of this invention have been found to be effective are *Alternaria solani*, *Botrytis fabae*, and *Phytophthora infestans*.

INDUSTRIAL USES (a) *Paint.*—A number of the hydantoin compounds of this invention have been found to be effective as fungicides against *Aspergillus niger* and *Phoma pigmentivora* in alkyd gloss paint when used at the rate of 2% by weight of the paint. Compounds of particular interest in this respect are the products of Examples 2, 3, 4, 8 and 14.

(b) *Timber.*—Compounds found to be active in controlling sapstain and surface growth of *Ceratocystis pilifera* are the products of Examples 1, 2, 5, 16, 20, 21, 22 and 23.

(c) *Textiles.*—Compounds found to be active in controlling *Chaetomium globosum* on cotton cloth are the products of Examples 1, 2, 3, 5, 20 and 22.

We claim:

1. A fungicidal composition comprising, as the essential active ingredient, a fungicidally effective amount of a hydantoin compound of the formula:

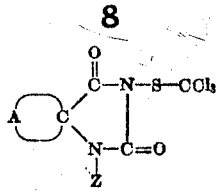

wherein the group A together with its adjacent carbon atom constitutes an alicyclic ring selected from the group consisting of cyclopentane, cyclohexane and cycloheptane; and Z is selected from the group consisting of hydrogen, acetyl and nitro, in admixture with a major amount of an inert, fungicidal carrier therefor.

2. A fungicidal composition according to claim 1 in which the hydantoin compound is in admixture with a powder diluent.

3. A fungicidal composition according to claim 1 in which the carrier is selected from the group consisting of water and a non-phytotoxic organic liquid.

4. A method of protecting a cellulosic vendible product from attack by fungi, in which the product is treated with a hydantoin compound according to claim 1.

5. A method of combatting plant fungi which comprises treating the habitat of said fungi with a hydantoin compound according to claim 1.

6. A paint containing as fungicide a minor proportion of a hydantoin compound according to claim 1.

7. A paint according to claim 6 in which the amount of fungicide is from ½ to 2% by weight of the paint.

8. The composition of claim 3 including a dispersing agent.

9. A fungicidal composition according to claim 1 wherein the alicyclic ring is cyclohexane.

10. A fungicidal composition according to claim 1 wherein the alicyclic ring is cyclopentane.

11. A fungicidal composition according to claim 1 wherein the alicyclic ring is cycloheptane.

12. A fungicidal composition according to claim 1 wherein the ring carries a lower alkyl substituent.

13. A fungicidal composition according to claim 1 wherein said hydantoin compound is α-3′:3′:5′-trimethylcyclohexane-N-trichloromethylmercapto - 5:5 - spirohydantoin.

References Cited by the Examiner

UNITED STATES PATENTS

| 2,553,775 | 5/1951 | Hawley et al. | 167—22 |
| 2,856,410 | 10/1958 | Kittleson et al. | 167—33 |
| 2,887,462 | 5/1959 | Van Oot | 260—40 |
| 2,909,501 | 10/1959 | Robitscheket et al. | 260—40 |
| 2,920,997 | 1/1960 | Wolf et al. | 260—309.5 |

JULIAN S. LEVITT, *Primary Examiner.*

VERA C. CLARKE, *Examiner.*